April 7, 1936.  R. G. SLINE  2,036,891
AEROPLANE WING
Filed May 1, 1935   2 Sheets-Sheet 1
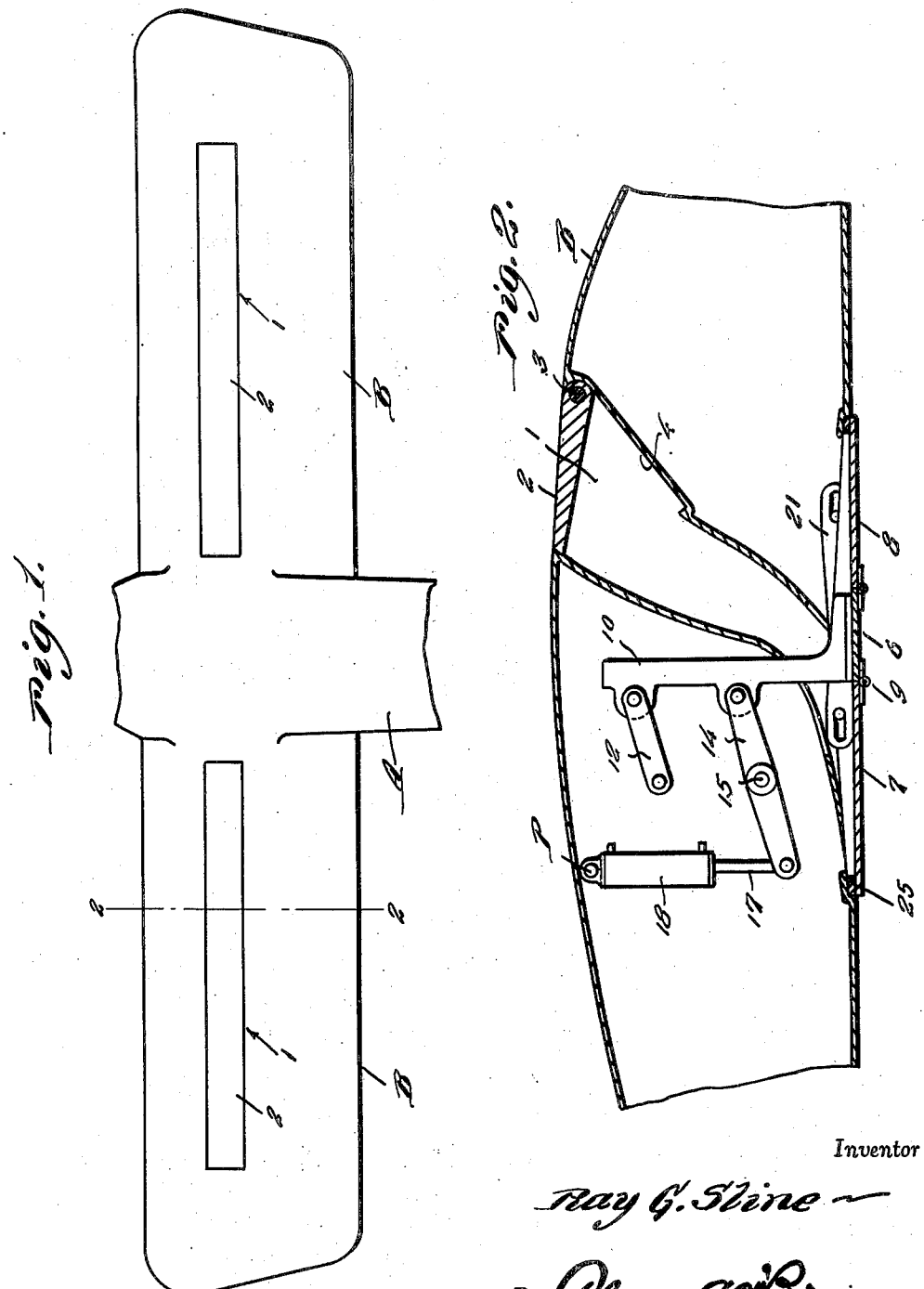
Inventor
Ray G. Sline
By Clarence A. O'Brien
Attorney

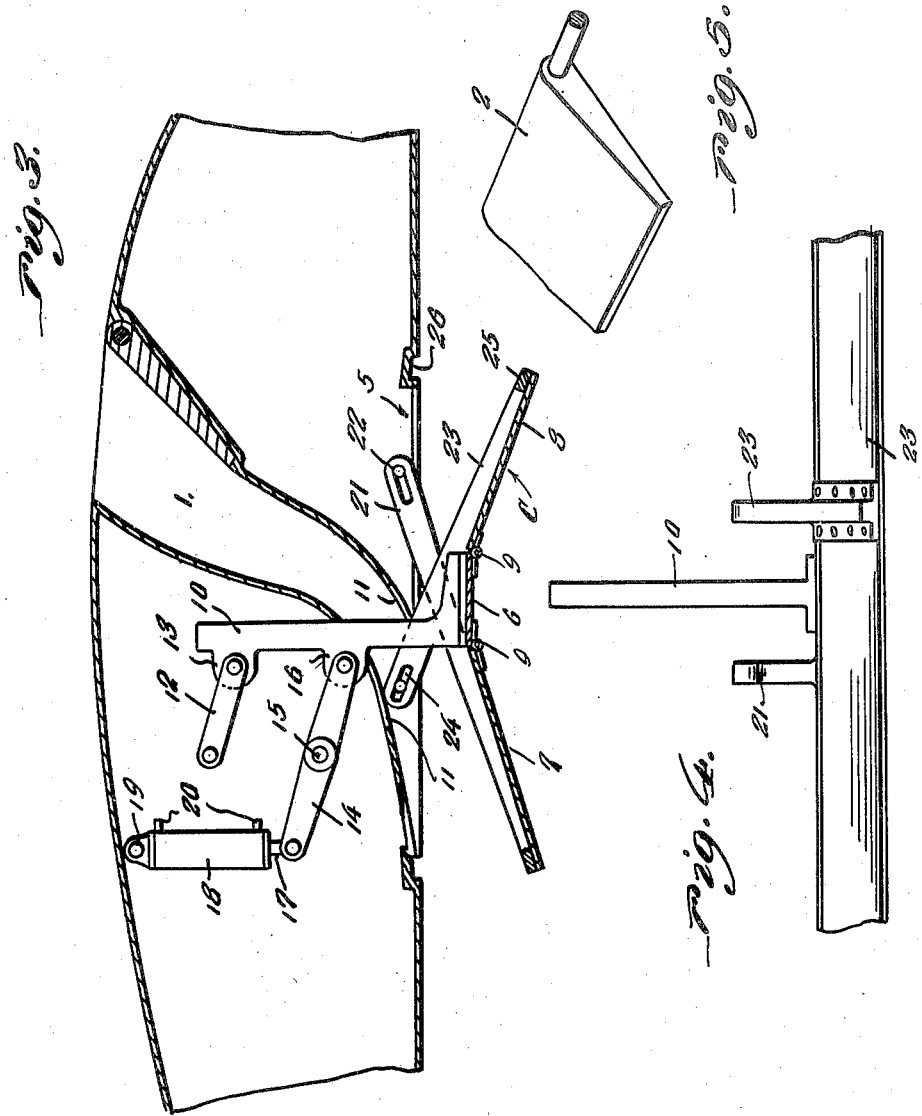

Patented Apr. 7, 1936

2,036,891

UNITED STATES PATENT OFFICE 2,036,891

AEROPLANE WING

Ray G. Sline, San Diego, Calif.

Application May 1, 1935, Serial No. 19,306

2 Claims. (Cl. 244—12)

This invention relates to a wing for aeroplanes. The general object of the invention is to provide means for increasing the lifting effect of the wing and enables a plane to take off easier and quicker and in less space and the invention also acts as an air brake and enables the plane to readily land.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a fragmentary top plan view of a plane constructed in accordance with this invention.

Figure 2 is a section on the line 2—2 of Figure 1 with the parts in closed position.

Figure 3 is a similar view with the parts in open position.

Figure 4 is a fragmentary front view of the lower member.

Figure 5 is a fragmentary perspective view of the top member or door.

In these drawings the body of the plane is shown at A and the wing structure at B and in carrying out my invention I provide a wing structure with any suitable number of passages 1 each of which extends longitudinally of the wing and slopes downwardly and rearwardly from the top surface to the lower surface. A hinge flap or door 2 controls the upper ends of these passages and has its forward edge hinged to a part of the structure as shown at 3 and the forward wall of the passage is provided with a recess 4 for receiving the door when the same is open as shown in Figure 3. The lower end of the passage opens out into the rear part of a bottom opening 5 in the wing structure which is adapted to be closed by the bottom surface member C which is composed of the central section 6, the rear section 7 and a front section 8, the two sections 7 and 8 being hingedly connected with the central section 6 as shown at 9. A substantially L-shaped supporting member 10 has its short arm fastened to the central section 6 and its long arm passing through openings 11 in the walls of the passage into the space between the top and bottom surfaces of the plane structure. A link 12 has one end pivoted to a part of the wing structure and its other end to an ear 13 formed on the upper end of the member 10. A lever 14 pivoted intermediate its end in the wing structure, as shown at 15, has one end pivoted to a second ear 16 on the member 10 and the other end is pivoted to the piston rod 17 of a hydraulic cylinder 18, the upper end of the cylinder being pivotally supported in the wing structure as shown at 19. Conduits 20 connected with a suitable source of supply are connected with the ends of the cylinder for moving the piston therein in either direction.

An arm 21 is connected with the upper face of the section 7 and has a slot and pin connection 22 at its forward end with a part of the wing structure while a similar arm 23 is connected with the upper surface of the section 8 and has a pin and slot connection 24 with a part of the wing structure within the lower end of the passage 1. Reinforcing members 25 are connected to the free end edges of the sections 7 and 8 and these parts enter grooves 26 in the bottom surface of the wing structure when the parts are in closed position as shown in Figure 2.

It will, of course, be understood that as many of the supporting members 10 and their associated parts can be used as required for supporting the member C.

The door 2 can be suitably connected to the operating means of the member C so as to be moved to open and closed position when the member C is moved to open and closed position or it may be operated manually by separate means.

As it will be seen when the piston in the hydraulic cylinder 18 is moved downwardly the member 10 will be raised and the arms 21 and 23 will cause the three sections of the member C to close the opening 5 and form a continuation of the bottom surface of the wing and the closing of the door 2 will form a continuation of the top surface and thus the passage 1 will be closed. When the piston is moved upwardly the member 10 and the parts associated therewith will lower the member C, as shown in Figure 3, and the opening of the door 2 will permit air to pass through the passage and flow against the section 7 which directs it toward the trailing edge of the wing. Some of the air under the wing will be directed by the section 8 between the member C and the wing structure. As it will be seen the passage 1 is so formed that it will act to choke the air stream as it reaches the lower part of the passage so that the stream will gain velocity and thus the air will be drawn into the passage which increases the lift of the wing by causing a greater vacuum above the wing.

The door 2 may be used to control the aeroplane or to balance a heavy load while the surface member C is in vacuum position or partly closing the door on the required side of the wing structure.

This invention will greatly increase the lifting action of the wing structure by increasing the vacuum over the surface of the wing, provides means for controlling the flight of the plane and also acts as an air brake.

The two surfaces, including the door 2 and the lower member, can be operated in any suitable manner and by any suitable means and in some cases the lower surface forming member can be held stationary in open position and never retracted to open position. This stationary surface may be used on gliders and small powered planes and while the drawings show the device used with a wing of an aircraft it may be used on a wing of a propeller such as that of an autogyro.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In an aircraft including a wing structure, a Venturi passage in the structure sloping downwardly and rearwardly from the top surface to the bottom surface with the upper end located nearer the front edge of the structure, a lower surface forming member and means for bodily lowering the entire part of said member below the bottom of the wing structure and for raising the member flush with the bottom of the wing structure, said member opening the lower end of the passage when in lowered position and closing said lower end of the passage when in raised position.

2. In an aircraft including a wing structure, a Venturi passage in the structure sloping downwardly and rearwardly from the top surface to the bottom surface with the upper end located nearer the front edge of the structure, a pivoted door for controlling the upper end of the passage, a lower surface forming member and means for lowering said member below the bottom of the wing structure and for raising the member flush with the bottom of the wing structure, said member opening the lower end of the passage when in lowered position and closing said lower end of the passage when in raised position, said member including a central section and front and rear sections hingedly connected with the central section, arms connected with the front and rear sections and having pin and slot connections with the wing structure, a member connected with the central section and manually controlled means for raising and lowering said member.

RAY G. SLINE.